(12) United States Patent
Cho et al.

(10) Patent No.: US 7,883,554 B2
(45) Date of Patent: Feb. 8, 2011

(54) LITHIUM SECONDARY BATTERY WITH SUPPRESSED DECOMPOSITION OF ELECTROLYTIC SOLUTION AND PREPARATION METHOD THEREOF

(75) Inventors: Myung-dong Cho, Kyungki-do (KR); Ju-yup Kim, Seoul (KR)

(73) Assignee: Samsung SDI Co., Ltd., Suwon, Kyungki-Do (KR)

(*) Notice: Subject to any disclaimer, the term of this patent is extended or adjusted under 35 U.S.C. 154(b) by 479 days.

(21) Appl. No.: 11/898,340

(22) Filed: Sep. 11, 2007

(65) Prior Publication Data

US 2008/0070116 A1 Mar. 20, 2008

Related U.S. Application Data

(62) Division of application No. 10/347,179, filed on Jan. 21, 2003, now Pat. No. 7,288,339.

(30) Foreign Application Priority Data

May 18, 2002 (KR) .............................. 2002-27598

(51) Int. Cl.
H01M 4/82 (2006.01)
H01M 4/60 (2006.01)
H01M 4/62 (2006.01)
H01M 2/16 (2006.01)
B05D 5/12 (2006.01)

(52) U.S. Cl. ...................... 29/623.5; 429/212; 429/217; 429/246; 427/58

(58) Field of Classification Search .................. 429/189, 429/137, 246, 217, 212; 29/623.5; 427/58
See application file for complete search history.

(56) References Cited

U.S. PATENT DOCUMENTS

| 5,607,485 | A | 3/1997 | Gozdz et al. |
| 6,143,042 | A | 11/2000 | Rogers |
| 6,566,013 | B2 | 5/2003 | Narukawa et al. |
| 6,586,140 | B2 * | 7/2003 | Tamura et al. ............... 429/317 |
| 6,933,080 | B2 | 8/2005 | Lee et al. |

FOREIGN PATENT DOCUMENTS

| CN | 1305239 A | 7/2001 |
| CN | 1317512 A | 10/2001 |
| JP | 6-052861 | 2/1994 |
| JP | 07-134980 A | 5/1995 |
| JP | 07-235328 A | 9/1995 |
| JP | 08-306353 A | 11/1996 |
| JP | 09-219188 A | 8/1997 |
| JP | 10-284131 A | 10/1998 |
| JP | 11-195433 | 7/1999 |
| JP | 2001-076733 | 3/2001 |
| KR | 10-0362285 | 11/2002 |

OTHER PUBLICATIONS

Chinese Office Action issued by the Chinese Patent Office on Jan. 28, 2005.
Japanese Office Action dated Apr. 4, 2005.
Notice to Submit Response issued by the Korean Industrial Property Office on May 24, 2004 in correspontion No. 10-2002-0027598.

* cited by examiner

Primary Examiner—Patrick Ryan
Assistant Examiner—Thomas H. Parsons
(74) Attorney, Agent, or Firm—Buchanan Ingersoll & Rooney PC

(57) ABSTRACT

Provided are a lithium secondary battery with suppressed decomposition of an electrolytic solution, and a preparation method thereof. The lithium secondary battery includes a current collector, a cathode and an anode having each active material layer formed on the current collector, and a polymer electrolyte interposed between the cathode and the anode. In the lithium secondary battery, a fluorine resin film is formed on at least one surface of the active material layers of the cathode and the anode. A fluorine resin exists in pores between constituents contained in at least one active material layer of the cathode and the anode. The polymer electrolyte is a polymerized product of a crosslinking monomer and an electrolytic solution including a lithium salt and an organic solvent. Also, a porous membrane made of an insulating resin is interposed between the cathode and the anode.

9 Claims, 2 Drawing Sheets

LITHIUM SECONDARY BATTERY WITH SUPPRESSED DECOMPOSITION OF ELECTROLYTIC SOLUTION AND PREPARATION METHOD THEREOF

This application is a divisional of U.S. patent application Ser. No. 10/347,179, filed Jan. 21, 2003, now U.S. Pat. No. 7,288,339, which claims the priority of Korean Patent Application No. 2002-27598 filed on May 18, 2002, which is incorporated herein in its entirety by reference.

BACKGROUND

1. Field of the Invention

Disclosed herein is a lithium secondary battery and preparation methods thereof, and more particularly, to a lithium secondary battery with improved lifetime and capacity characteristics by suppressing a reaction between propylene carbonate (PC) and carbon as electrolyte constituents.

2. Description of the Related Art

In recent years, according to progress of portable electronic appliances and wireless communication systems, there has been increasing demands for highly reliable, high-performance batteries. Also, for solving problems of energy and environmental requirements, development of secondary batteries as large power sources for realizing electromotive vehicles and effectively utilizing night electricity, has become increasingly demanded. Among these secondary batteries, lithium secondary batteries are drawing particular attention because of their good properties such as high operation voltage and high energy density.

Lithium secondary batteries are classified into lithium-ion secondary batteries using an aqueous electrolytic solution and lithium polymer batteries using a solid-type electrolytic solution. The lithium ion battery has problems, such as leakage of an electrolytic solution while in use. Thus, vigorous research into lithium polymer batteries which are leak-tight and flexibly packaged in a desired shape and can be formed in a large scale has recently been made.

Lithium polymer batteries are expected to solve various problems with lithium ion batteries using a liquid electrolytic solution such as low safety, high cost or disadvantage in attaining large-scale, high capacity batteries. However, in order to solve the above-described problems, lithium polymer batteries must satisfy various requirements such as stability over a wide voltage range so as to withstand overcharge/overdischarge, high ionic conductivity and chemical, electrochemical compatibility with electrode materials or other materials present in a cell.

Japanese Laid-Open Patent Nos. 7-134980, 7-235328 and 9-219188 disclose an anode preparation technique using electrode slurry prepared by mixing a carbon material and a polymer electrolyte in manufacturing an anode. According to this technique, a conduction path of electricity may be closed, the internal resistance of an electrode is disadvantageously high and the energy density per unit area is reduced.

Japanese Laid-Open Patent No. 10-284131 discloses a lithium secondary battery with a path of a gel-type electrolytic solution provided in an active material by adding a polymer to active material powder. In electrodes of the lithium secondary battery disclosed herein, lots of pores are present between electrode active materials, lowering a binding force between the active materials and exhibiting poor battery performance in view of uniformity and distribution of pores.

Japanese Laid-Open Patent No. 8-306353 discloses a technique in which alkali metal containing polymers such as polyethylene oxide (PEO) or polypropylene oxide (PPO) are applied onto electrode surfaces and crosslinked. However, such polymers present several problems, that is, they may be dissolved in an electrolytic solution after crosslinkage because of their own properties and the electrolytic solution may infiltrate into electrodes.

Lithium polymer batteries are classified, depending upon the kind of the electrolyte used therein, into a solid type containing no organic electrolytic solution, and a gel type containing an organic electrolytic solution.

A gel type electrolyte forms a stable gel with a polymer host structure by adding an excessive electrolytic solution. The gel is thereby is impregnated into a polymer matrix. Although the gel type electrolyte has higher ionic conductivity at room temperature than a completely solid polymeric electrolyte, it is rather poor in mechanical characteristic. Examples of an organic solvent useful to form the electrolytic solution include ethylene carbonate (EC) and propylene carbonate (PC). In particular, PC having a high boiling point is essentially necessary for crosslinkage for forming a gel-type polymer electrolyte.

However, PC may be decomposed by reacting with carbon as an anode material to produce a gas, resulting in swelling and deterioration of cycle characteristics.

SUMMARY

To solve some or all of the above-described problems, disclosed herein is an electrode for a lithium secondary battery capable of effectively suppressing decomposition of an electrolytic solution, particularly propylene carbonate, and having an improved binding force between the electrode and a polymer electrolyte, a lithium secondary battery employing the electrode, and a preparation method thereof.

In an aspect disclosed herein is, there is provided an electrode for a lithium secondary battery comprising a current collector and an active material layer formed on the current collector, wherein a fluorine resin film is formed on the active material layer, and a fluorine resin exists in pores between constituents contained in the active material layer.

The active material layer may include an active material and a conductive agent, and the fluorine resin exists between the active material and the conductive agent and on surfaces of the active material and the conductive agent.

The fluorine resin includes at least one selected from the group consisting of vinylidenefluoride-hexafluoropropylene (VdF-HFP) copolymer and polyvinylidenefluoride, and is prepared by coating a composition containing a low-concentration fluorine resin and drying the resultant product. Here, the composition preferably contains 0.5 to 7 parts by weight of fluorine resin and 93 to 99.5 parts by weight of an organic solvent.

In accordance with another aspect disclosed herein is, there is provided a lithium secondary battery comprising a current collector, a cathode and an anode having each active material layer formed on the current collector, and a polymer electrolyte interposed between the cathode and the anode, wherein a fluorine resin film is formed on at least one surface of the active material layers of the cathode and the anode, a fluorine resin exists in pores between constituents contained in at least one active material layer of the cathode and the anode, the polymer electrolyte is a polymerized product of a crosslinking monomer and an electrolytic solution including a lithium salt and an organic solvent, and a porous membrane made of an insulating resin is interposed between the cathode and the anode.

The active material layer may include an active material and a conductive agent, and the fluorine resin exists between the active material and the conductive agent and on surfaces of the active material and the conductive agent.

In an embodiment disclosed herein is, the porous membrane is a cellulose non-woven fabric, a vinylidenefluoride-hexafluoropropylene (VdF-HFP) copolymer film, a polyethylene film, a polypropylene film, a double layer of polyethylene/polypropylene or a triple layer of polypropylene/polyethylene/polypropylene.

The thickness of the fluorine resin film is preferably in the range of 0.5 to 10 μm.

The crosslinking monomer is at least one selected from the group consisting of hexyl acrylate, butyl acrylate, trimethylolpropane triacrylate (TMPTA), butanediol dimethacrylate, diallylsuberate, ethylene glycol dimethacrylate, poly(ethyleneglycol) dimethylacrylate, diglycidyl ester, acrylamide and divinyl benzene.

In an embodiment disclosed herein, the lithium secondary battery may further include at least one second crosslinking monomer as the compound capable of crosslinking with the crosslinking monomer, the second crosslinking monomer being at least one selected from the group consisting of polyethylene oxide, polyvinylpyrrolidone, polyacrylonitrile, acrylonitrile-methylmethacrylate-styrene terpolymer, and vinylene resin such as vinyl acetate, 2-vinyl-2,3-dioxolane, acrylomorphorine and vinylmethacrylate.

According to still another aspect, disclosed herein is a method of preparing a lithium secondary battery including (a) coating a composition containing a fluorine resin and an organic solvent so that a fluorine resin film is formed on at least one surface of active material layers of a cathode and an anode, the fluorine resin exists in pores between constituents contained in at least one active material layer of the cathode and the anode, and drying the coated product, (b) interposing a porous membrane made of an insulating resin between the cathode and the anode to form an electrode assembly, (c) accommodating the electrode assembly into a battery case and injecting a polymer electrolyte composition containing a crosslinking monomer and an electrolytic solution including a lithium salt and an organic solvent into the battery case, and (d) polymerizing the product of the step (c).

In step (a), the active material layer may include an active material and a conductive agent and the fluorine resin exists between the active material and the conductive agent and on surfaces of the active material and the conductive agent.

The polymer electrolyte composition of step (c) may include 2 to 7 parts by weight of the crosslinking monomer and 93 to 98 parts by weight of the electrolytic solution based on the total weight of the composition.

In step (d), polymerization is performed by heating at a temperature in the range of 60 to 130° C. or radiation by e-beam, γ-beam or UV-ray.

The polymer electrolyte composition of step (c) may further include a second crosslinking monomer capable of crosslinking with the crosslinking monomer and the amount of the second crosslinking monomer is in the range of 5 to 20 parts by weight based on the total weight of the crosslinking monomer.

Also, the polymer electrolyte composition of step (c) may further include 1 to 5 parts by weight of a polymerization starter based on the 100 parts by weight of the crosslinking monomer.

BRIEF DESCRIPTION OF THE DRAWINGS

The devices and methods disclosed herein will become more apparent by describing in detail preferred embodiments thereof with reference to the attached drawings in which.

DETAILED DESCRIPTION OF SPECIFIC EMBODIMENTS

Figure 1:
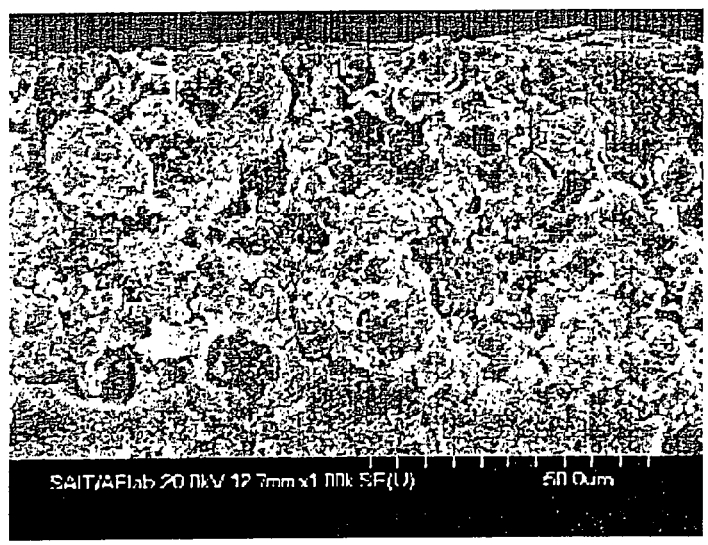
FIG. 1 is a scanning electron microscope (SEM) photograph showing the cross-section of a an embodiment of cathode prepared in Example 2 herein.

In an embodiment disclosed herein, an electrode surface is coated with a fluorine resin film composition containing a low-concentration fluorine resin and an organic solvent and dried to form a fluorine resin film on the electrode surface, with the fluorine resin existing in pores among constituents of an electrode, specifically electrode active material layer, preferably between the electrode active material and a conductive agent and on the surfaces of the electrode active material and the conductive agent, to suppress a direct contact between the electrode and the electrolytic solution, thereby effectively suppressing decomposition of propylene carbonate (PC). In more detail, if an electrode, specifically an anode, is coated with a fluorine resin film, the fluorine resin film infiltrates into the anode through pores formed in the anode, thereby forming a fluorine resin film on the surface of carbon present in the anode. If the fluorine resin film is coated on the carbon surface in such a manner, decomposition of PC is suppressed or minimized due to a reaction between carbon and an electrolytic solution, and the binding force between the electrode and the polymer electrolyte is increased to thus reduce interface resistance therebetween. Also, there are several advantages of a shortened crosslinking time for forming a gel-type polymer electrolyte and a lowered crosslinking temperature.

The fluorine resin is contained in the composition for forming the fluorine resin film at a low concentration, that is, 0.5 to 7 parts by weight, preferably 1 to 3 parts by weight, based on 100 parts by weight of the composition. If the amount of the fluorine resin is greater than 7 parts, the fluorine resin film formed on the electrode surface is excessively thick. If the amount of the fluorine resin is less than 0.5 parts, it is difficult to uniformly coat fluorine resin. Examples of the fluorine resin used to form the fluorine resin film include at least one selected from the group consisting of a vinylidenefluoride-hexafluoropropylene copolymer and polyvinylidenefluoride, preferably a vinylidenefluoride-hexafluoropropylene copolymer. In the copolymer, the amount of a hexafluoropropylene repeating unit is preferably in the range of 10 to 15% by weight. The amount of a vinylidenefluoride repeating unit is preferably in the range of 85 to 90% by weight, and the weight average molecular weight thereof is preferably 300,000 to 600,000. Any solvent that can dissolve the fluorine resin can be useful as the organic solvent, and examples thereof include tetrahydrofuran (THF), acetone and dimethyl carbonate. The amount of the organic solvent used is preferably in the range of 93 to 99.5 parts by weight based on 100 parts by weight of the composition for forming the fluorine resin film. If the amount of the organic solvent is less than 93 parts, the fluorine resin film formed on the electrode surface is overly thick to increase interface resistance. If the amount of the organic solvent is greater than 99.5 parts, the fluorine resin cannot uniformly infiltrate into or be uniformly applied onto the electrode, which is undesirable.

The thickness of the fluorine resin film is preferably in the range of 0.5 to 10 μm. If the thickness of the fluorine resin is greater than 10 the fluorine resin film acts as a resistor, thereby lowering ionic conductivity of the battery. If the thickness of the fluorine resin is less than 0.5 μm, the decomposition suppressing effect of the electrolytic solution is undesirably small.

A method of preparing a lithium secondary battery disclosed herein will now be described.

First, an electrode active material layer is formed on a current collector using an electrode active material composition containing an electrode active material, a binder, a conductive agent and a solvent. Here, the formation method of the electrode active material layer include directly coating an electrode active material composition on a current collector, coating an electrode active material composition on a separate support member current collector, followed by drying the resultant structure, and laminating a film stripped from the support member. Any material that supports the active material layer can be used as the support member, and concrete examples thereof include a mylar film and a polyethyleneterephthalate (PET) film.

Examples of the current collector include, but not particularly limited to, a foil, an expanded metal mesh and a punched metal. A metal film itself can be used as a current collector for an anode.

In embodiments disclosed herein, a lithium metal composite oxide such as $LiCoO_2$ or $LiMn_2O_4$ or a sulfur compound is used as a cathode active material, and a carbon material or graphite such as mesocarbon microbead (MCMB), mesocarbon fiber (MCF) or PHS (commercially available from Japan Carbon Co.) is used as an anode active material. Examples of the conductive agent include carbon black such as MCMB, MCF, Super-P or acetylene black. Here, the conductive agent is preferably used in an amount of 1 to 20 parts by weight based on 100 parts by weight of the electrode active material.

Examples of the binder include a vinylidenefluoride-hexafluoropropylene (VdF-HFP) copolymer, polyvinylidenefluoride, polyacrylonitrile, polymethacrylate or mixtures thereof. Here, the content of the binder is 5 to 30 parts by weight based on 100 parts by weight of the electrode active material.

As the solvent, any solvent useful for typical lithium secondary batteries can be used, and examples thereof include acetone and N-methylpyrrolidone (NMP).

To enhance battery performance, $Li_2CO_3$ may be further added to the electrode active material composition.

As described above, a cathode and an anode are prepared by known methods employed for manufacturing a general lithium secondary battery.

Then, the fluorine resin film composition is coated on the cathode and/or anode and vacuum dried. Here, the drying temperature is preferably in the range of 60 to 80° C., more preferably at 70° C.

A porous membrane made of an insulating resin sheet having a network structure is interposed between the thus obtained cathode and anode and wound or stacked, thereby forming an electrode assembly. In the case where the electrode assembly is formed based on stacking, the cathode, a polymer electrolyte and an anode are sequentially stacked to form a unit cell. By stacking a plurality of unit cells, a high capacity battery can be attained.

The porous membrane has a supporting property and is interposed between the cathode and the anode for insulating each other and made of an insulating material having a porosity of not less than 30% so as to impregnate a non-aqueous organic electrolytic solution. Examples of the insulating material satisfying these requirements include a cellulose non-woven fabric, a VdF-HFP copolymer film, a polyethylene film, a polypropylene film, a double layer of polyethylene/polypropylene and a triple layer of polypropylene/polyethylene/polypropylene.

Thereafter, the thus formed electrode assembly is accommodated in an electrode case. Then, a polymer electrolyte composition is injected into the electrode case having the electrode assembly. Here, the injection of the polymer electrolyte composition is advantageously performed under a decompressed condition.

The obtained resultant structure is subjected to heat treatment to carry out thermal polymerization or photopolymerization by radiation. The heating temperature for thermal polymerization is preferably in the range of 60 to 130° C., more preferably 70 to 80° C. If the heating temperature is lower than 60° C., a monomer or a crosslinking agent present in the battery cannot completely participate in a reaction. If the heating temperature is higher than 130° C., decomposition of an electrolytic solution or deformation of the monomer or crosslinking agent may undesirably occur due to a high temperature. For photopolymerization, e-beam, γ-beam or UV-ray is preferably used.

The polymer electrolyte composition is prepared by mixing a crosslinking monomer and an electrolyte solution composed of a lithium salt and an organic solvent.

In the present invention, the crosslinking monomer has no particular restriction as to the kind as long as it is a material having at least two double bonds to be crosslinkable by heat or light. Examples of the crosslinking monomer are at least one selected from the group consisting of diacrylate or triacrylate, such as hexyl acrylate, butyl acrylate or trimethylolpropane triacrylate (TMPTA); di-methacrylate such as butanediol dimethacrylate, or trimethacrylate; diallyl ester such as diallylsuberate or triallyl ester; ethylene glycol dimethacrylate or polyethyleneglycol) dimethylacrylate; diglycidyl ester; acrylamide; and divinyl benzene. It is preferable to use bi-functional acryl-based resins which include polyethylene glycol dimethacrylate. The mixture ratio by weight of the crosslinking monomer to the electrolytic solution is preferably in the range of 1:1 to 1:15. If the weight of the crosslinking monomer is smaller than the above range, crosslinking chains length are too short, resulting in leakage of the electrolytic solution and poor mechanical property. If the weight of crosslinking monomer is greater than the above range, a crosslinked polymer matrix becomes too brittle.

If polymerization is carried out using the crosslinking monomer according to the present invention, radicals are first formed at the double bonds present at terminals of the crosslinking monomer, and then the radicals bond with another polymer to form crosslinkage.

The composition for forming the polymer electrolyte may further include compounds capable of crosslinking with the crosslinking monomer, that is, second crosslinking monomers, which are at least one selected from the group consisting of polyethylene oxide, polyvinylpyrrolidone, polyacrylonitrile, acrylonitrile-methylmethacrylate-styrene terpolymer, and vinylene resin such as vinyl acetate, 2-vinyl-2,3-dioxolane, acrylomorpholine or vinylmethacrylate.

When the crosslinking monomer is polymerized with the second crosslinking monomer, the added second crosslinking monomer further increases the mechanical strength of the finally obtained polymer electrolyte. The second crosslinking monomer is used in an amount of 5 to 20 parts by weight based on the total weight of the crosslinking monomer. If the amount of the second crosslinking monomer exceeds the above range, the ionic conductivity is undesirably reduced.

To promote polymerization of the crosslinking monomer, a thermal polymerization initiator or photo-polymerization initiator, depending on the energy source used for a subsequent gelling process, may be further added to the polymer electrolyte composition. As the polymerization starter, any starting material that is typically used in the art can be used without particular restriction. Examples of the thermal polymerization starter include azoisobutyronitrile (AIBN), diacetyl peroxide, cumyl peroixide and the like. Examples of the photo-polymerization starter include AIBN, benzoin benzoyl ethyl ether (BEE) and disulfide. The polymerization starter is preferably used in an amount of 1 to 10 parts by weight based on 100 parts by weight of the crosslinking monomer.

The electrolytic solution in the composition forming the polymer electrolyte includes a lithium salt and an organic solvent, and the amount thereof is preferably in the range of 100 to 1500 parts by weight based on 100 parts by weight of the crosslinking monomer. If the amount of the electrolytic solution is less than 100 parts, the ionic conductivity of the polymer electrolyte is undesirably lowered. If the amount of the electrolytic solution is greater than 1500 parts, the mechanical property of the polymer electrolyte is undesirably deteriorated.

The lithium salt is at least one selected from the group consisting of $LiClO_4$, $LiCF_3SO_3$, $LiPF_6$, $LiN(CF_3SO_2)_2$ and $LiBF_4$, The organic solvent is preferably at least one selected from the group consisting of ethylene carbonate (EC), propylene carbonate (PC), dimethyl carbonate (DMC), ethylmethyl carbonate (EMC), dipropyl carbonate, diethoxyethane, dimethoxyethane, γ-butyrolactone, dioxolane and polyethylglycol dimethylether. In particular, in the present invention, EC/DMC/EMC, EC/DMC/EMClPC, EC/DMC/PC or EC/PC mixtures are used as the electrolytic solution. The concentration of the lithium salt in the electrolytic solution is preferably 0.5 to 1.5 M.

The battery according to the present invention is not specifically limited in view of its case shape, and a cylindrical or rectangular case and a pouch type case can be used in the present invention. The pouch type case is advantageously used because a lightweight, high-energy density battery can be easily manufactured.

If the polymer electrolyte composition is injected into the battery case, the electrolytic solution is impregnated into an electrode and a porous membrane. However, the crosslinking monomer having a relatively large molecular weight cannot impregnated thereinto but remains on the surface of the electrode and the porous membrane. Heating or radiation induces crosslinkage between the crosslinking monomers remaining on the surface of the electrode and the porous membrane or between the crosslinking monomer and a crosslinkable compound, leading to gelation.

The crosslinkage between the crosslinking monomers or between the crosslinking monomer and a crosslinkable compound gives rise to formation of a network structure on the surface of the electrode and porous membrane, to prevent the electrolytic solution impregnated into the porous membrane from leaking out, thereby enhancing a binding force between the electrode and the porous membrane.

The various embodiments disclosed herein will now be described through the following examples, which are exemplary of, and not limiting of, the embodiments disclosed herein.

Example 1

1 g of Kynar 2801 (produced by Elf Atochem) as a crosslinking monomer (VdF-HFP copolymer mixed in a weight ratio of 88:12) was dissolved in 99 g of THF to prepare a fluorine resin film composition.

94 g of $LiCoO_2$, 3 g of Super-P and 3 g of polyvinylidenefluoride (PVDF) were dissolved in 80 g of N-methyl-2-pyrrolidone to prepare a cathode active material slurry. The cathode active material slurry was coated on an aluminum (Al) foil having a width of 4.9 cm and a thickness of 147 μm, followed by drying at 80° C., thereby forming a VdF-HFP copolymer film having a thickness of 7 μm on a cathode.

Separately, 90 g of mezophase carbon fiber (MCF) (Petoca Ltd., Japan), 10 g of PVDF were dissolved in 80 g of N-methyl-2-pyrrolidone to prepare an anode active material slurry. The anode active material slurry was coated on a copper foil having a width of 5.1 cm and a thickness of 178 μm, followed by drying at 90° C., thereby forming a VdF-HFP copolymer film having a thickness of 7 μm on an anode.

A porous VdF-HFP film (commercially available in the trade name of Celgard by Hoechst and having a porosity of 30-50%) was interposed between the cathode and anode and wound to form an electrode assembly. The electrode assembly was put into a battery case, decompressed and then a polymer electrolyte composition to be described below was injected into the battery case under a decompressed condition. The polymer electrolyte composition was prepared by mixing 50 g of a n electrolytic solution containing 1.3M $LiPF_6$ and EC:DMC:PC in a weight ratio of 3:5:2, 7.5 g of polyethylene glycol dimethacrylate and 0.5 g of AlBN.

Thereafter, the resultant product was cured at 70° C. for approximately 15 seconds, thereby completing a lithium secondary battery.

Example 2

A lithium secondary battery was completed in the same manner as in Example 1 except that in preparing the fluorine resin film composition, the amounts of Kynar 2801 and THF were changed into 2 g and 98 g, respectively.

Examples 3-7

Lithium secondary batteries were completed in the same manner as in Example 1 except that in preparing the fluorine resin film composition, the amounts of Kynar 2801 and THF were changed into 3 g and 97 g; 4 g and 96 g; 5 g and 95 g; 6 g and 94 g; and 7 g and 93 g, respectively.

Comparative Example

A lithium secondary battery was completed in the same manner as in Example 1 except that the step of forming VdF-HFP copolymer films by applying a fluorine resin film composition on surfaces of a cathode and an anode and drying, was not performed and heat treatment for curing was performed at 90° C. for 25 seconds.

Figure 2:
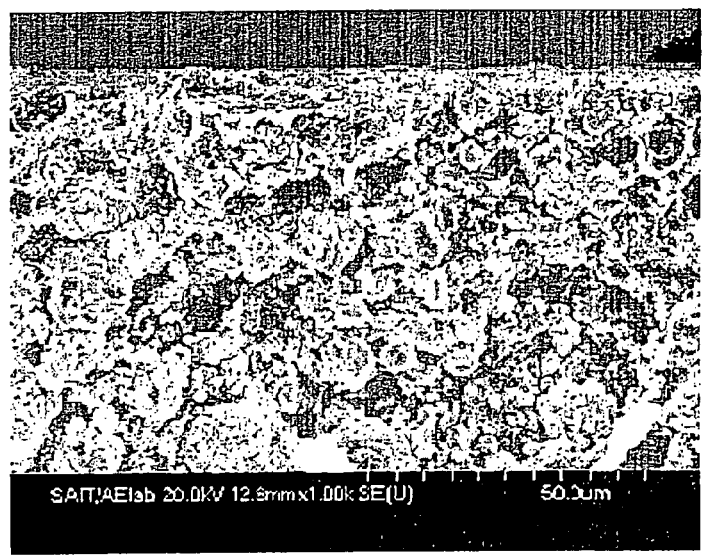
FIG. 2 is an SEM photograph showing the cross-section of a cathode prepared in Comparative Example.

In the lithium secondary batteries prepared in Example 2 and Comparative Example, the cross-sections of cathodes were examined by scanning electron microscope (SEM) and the results thereof are shown in FIGS. 1 and 2.

FIG. 1 is a scanning electron microscope (SEM) photograph showing the cross-section of a cathode prepared in Example 2 of the present invention, and FIG. 2 is an SEM photograph showing the cross-section of a cathode prepared in Comparative Example. FIGS. 1 and 2 show the extent of the VdF-HFP copolymer film coated on the electrode and the extent of the VdF-HFP copolymer infiltrated into the electrode. Compared to the cathode shown in FIG. 2, the cathode shown in FIG. 1 has the VdF-HFP copolymer existing between active materials in the electrode. In contrast, more pores are distributed throughout the cathode shown in FIG. 2 than that shown in FIG. 1.

Figure 3:
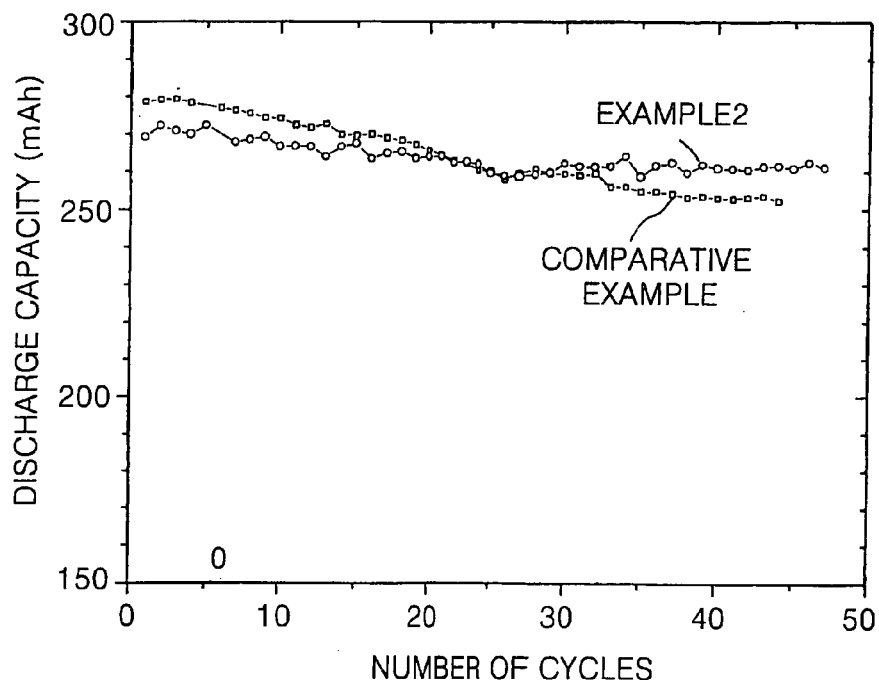
FIG. 3 is a graphical representation of cycle characteristics of lithium secondary batteries prepared in Example 2 and Comparative Example.

Cycle characteristics of the lithium secondary batteries prepared in Example 2 and Comparative Example were examined and the results thereof are shown in FIG. 3.

Referring to FIG. 3, after 45 cycles, the lithium secondary battery prepared in Example 2 was approximately 96% in initial capacity retention whereas the lithium secondary battery prepared in Comparative Example was approximately 89% in initial capacity retention. Thus, it is confirmed that formation of a Kynar 2801 film on the electrode improves capacity and charge/discharge characteristics of a battery.

In the lithium secondary batteries prepared in Examples 1-7 and Comparative Example, the swelling and impedance characteristics were examined and the results thereof are shown in Table 1. The swelling characteristics of the batteries were evaluated by observing a change in battery thickness, the discharge capacities were measured at a rate of 0.2 C, and the impedance characteristic was evaluated by determining resistance values before and after charging/discharging.

TABLE 1

| | Amount of Kynar 2801 (parts by weight) | Swelling thickness (mm) | Discharge capacity (mAh) | Impedance R (Ω) |
|---|---|---|---|---|
| Standard | — | 3.3 | 320 | — |
| Example 1 | 1 | 7.15 | 310 | 0.6 |
| Example 2 | 2 | 5.4 | 310 | 0.58 |
| Example 3 | 3 | — | 308 | — |
| Example 4 | 4 | 5.31 | 289 | 0.46 |
| Example 5 | 5 | — | 276 | — |
| Example 6 | 6 | 4.73 | 260 | 0.33 |
| Example 7 | 7 | — | 230 | — |
| Comparative Example | 0 | 9.39 | 315 | 0.75 |

In Table 1, the term "standard" denotes the dimension of a battery as designed at primarily charged/discharged states.

As can be understood from Table 1, the lithium secondary batteries prepared in Examples 1-7 had better swelling characteristic and lower interface resistance than the lithium secondary battery prepared in Comparative Example.

In the lithium secondary batteries prepared in Examples 1-7 and Comparative Example, the time and temperature for crosslinkage for forming a polymer electrolyte were examined.

The results showed that the lithium secondary battery prepared in Example 1 had shorter time and lower temperature for crosslinkage than in Comparative Example, which is attributed to the structural similarity of the polymer coated on surface of the electrodes and the polymer electrolyte.

Figure 4:
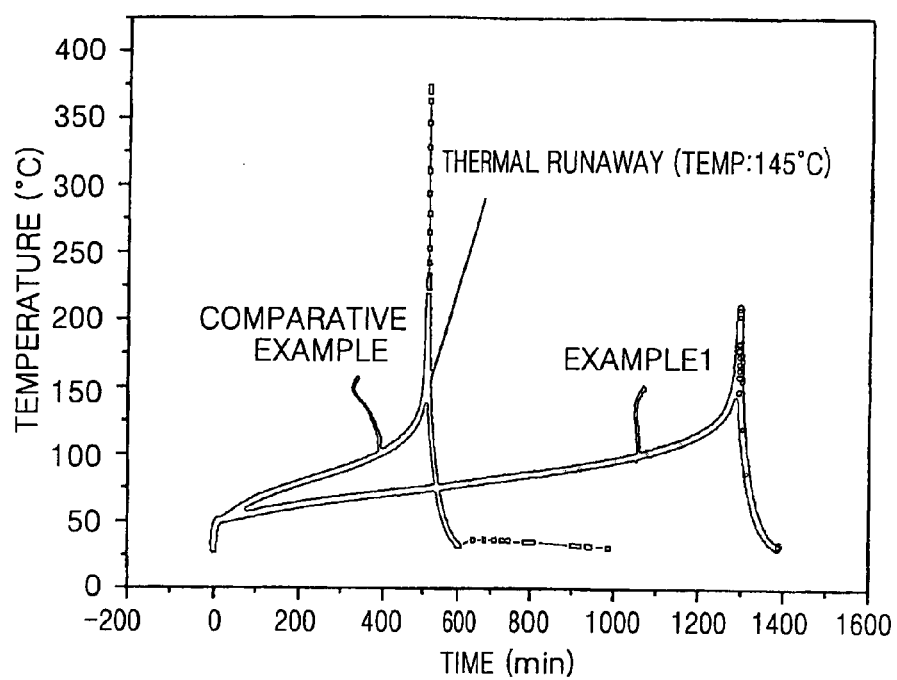
FIG. 4 is a graphical representation of high-temperature storage characteristics of lithium secondary batteries prepared in Example 1 and Comparative Example.

In the lithium secondary batteries prepared in Example 1 and Comparative Example, the high-temperature storage characteristics were examined, and the results thereof are shown in FIG. 4.

FIG. 4 shows time-dependent heat generated when the batteries were stored at high temperature. Referring to FIG. 4, the lithium secondary battery prepared in Comparative Example exhibited thermal runaway-along with an abrupt exothermic reaction after 400 minutes. On the other hand, the lithium secondary battery prepared in Example 1 exhibited no thermal runaway and an exothermic reaction slightly occurred after approximately 1200 minutes.

The method disclosed herein has the following advantages.

First, a fluorine resin such as VdF-HFP copolymer is coated on an electrode surface, particularly an anode surface, so that the copolymer infiltrates into pores in the electrode to suppress a direct contact between carbon of the anode and propylene carbonate of an electrolytic solution even during injection of the electrolytic solution, thereby effectively suppressing decomposition of PC.

Second, since the decomposition between carbon and PC is suppressed, relatively cheap carbon materials such as KCF, mesocarbon fiber (MCF) or PHS can replace expensive mesocarbon microbead (MCMB), thereby reducing the manufacturing cost.

Third, a binding force between an electrode and a gel-type polymer electrolyte is increased.

Fourth, compared to the manufacture of conventional gel-type polymer electrolytes, the time and temperature required for crosslinkage for forming a gel-type polymer electrolyte according to the present invention can be reduced.

Fifth, use of a porous membrane in addition to the gel-type polymer electrolyte can increase the mechanical strength of the gel-type polymer electrolyte.

Sixth, enhanced thermal stability of the lithium secondary battery according to the present invention leads to an increase in high-temperature stability, and cycle life characteristics thereof can also be improved.

The invention having been described by reference to certain specific embodiments and examples thereof, it will be understood that these specific embodiments and examples are not limiting of the appended claims.

What is claimed is:

1. An electrode for lithium secondary battery comprising a current collector and an active material layer formed on the current collector, wherein a fluorine resin film is formed on the active material layer, and the fluorine resin film infiltrates into pores between constitutents contained in the active material layer, wherein the fluorine resin film or the fluorine resin is prepared by coating the electrode with a composition containing 0.5 to 7 parts by weight of fluorine resin and 93 to 99.5 parts by weight of an organic solvent, and drying the resultant coating.

2. The electrode according to claim 1, wherein the active material layer includes an active material and a conductive agent, and the fluorine resin exists between the active material and the conductive agent and on the surface of the active material and the conductive agent.

3. The electrode according to claim 1, wherein the fluorine resin includes at least one selected from the group consisting of vinylidenefluoride-hexafluoropropylene (VdF-HFP) copolymer and polyvinylidenefluoride.

4. An electrode for lithium secondary battery comprising a current collector and an active material layer formed on the current collector, wherein a fluorine resin film is formed on the active material layer, and the fluorine resin film infiltrates into pores between constitutents contained in the active material layer, wherein the amount of the fluorine resin is in the range of 1 to 3 parts by weight.

5. A method of preparing a lithium secondary battery comprising:

(a) coating a composition containing a fluorine resin and an organic solvent so that a fluorine resin film is formed on a least one surface of active material layers of a cathode and an anode, such that the fluorine resin infiltrates into pores between constituents contained in at least one active material layer of the cathode and the anode, and drying the coated product;
(b) interposing a porous membrane made of an insulating resin between the cathode and the anode to form an electrode assembly;
(c) accommodating the electrode assembly into a battery case and injecting a polymer electrolyte composition containing a crosslinking monomer and an electrolyte solution including a lithium salt an organic solvent into the battery case, wherein the polymer electrolyte composition of step (c) includes 2 to 7 parts by weight of the crosslinking monomer and 93 to 98 parts by weight of the electrolytic solution based on 100 parts by weight of the composition; and
(d) polymerizing the product of the step (c).

6. The method according to claim 5, wherein in step (a), the active material layer includes an active material and a conductive agent and the fluorine resin exists between the active material and the conductive agent and on surfaces of the active material and the conductive agent.

7. The method according to claim 5, wherein in step (d), polymerization is performed by heating at a temperature in the range of 60 to 130° C. or radiation by e-beam, γ-beam or UV-ray.

8. A method of preparing a lithium secondary battery comprising:
(a) coating a composition containing a fluorine resin and an organic solvent so that a fluorine resin film is formed on a least one surface of active material layers of a cathode and an anode, such that the fluorine resin infiltrates into pores between constituents contained in at least one active material layer of the cathode and the anode, and drying the coated product;
(b) interposing a porous membrane made of an insulating resin between the cathode and the anode to form an electrode assembly;
(c) accommodating the electrode assembly into a battery case and injecting a polymer electrolyte composition containing a crosslinking monomer and an electrolyte solution including a lithium salt an organic solvent into the battery case; and
(d) polymerizing the product of the step (c),
wherein the polymer electrolyte composition of step (c) further includes a second crosslinking monomer capable of crosslinking with the crosslinking monomer and the amount of the second crosslinking monomer is in the range of 5 to 20 parts by weight based on 100 parts by weight of the crosslinking monomer.

9. A method of preparing a lithium secondary battery comprising:
(a) coating a composition containing a fluorine resin and an organic solvent so that a fluorine resin film is formed on a least one surface of active material layers of a cathode and an anode, such that the fluorine resin infiltrates into pores between constituents contained in at least one active material layer of the cathode and the anode, and drying the coated product;
(b) interposing a porous membrane made of an insulating resin between the cathode and the anode to form an electrode assembly;
(c) accommodating the electrode assembly into a battery case and injecting a polymer electrolyte composition containing a crosslinking monomer and an electrolyte solution including a lithium salt an organic solvent into the battery case; and
(d) polymerizing the product of the step (c),
wherein the polymer electrolyte composition of step (c) further includes 1 to 5 parts by weight of a polymerization starter based on 100 parts by weight of the crosslinking monomer.

* * * * *